United States Patent
Hsieh

(10) Patent No.: US 6,711,307 B1
(45) Date of Patent: Mar. 23, 2004

(54) METHOD AND APPARATUS FOR DARK LEVEL INTEGRATION OF IMAGE SENSOR WITHOUT INTEGRATING BAD PIXELS

(75) Inventor: Ming-Tsun Hsieh, Mountain View, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 609 days.

(21) Appl. No.: 09/670,685

(22) Filed: Sep. 27, 2000

Related U.S. Application Data

(60) Provisional application No. 60/217,535, filed on Jul. 12, 2000.

(51) Int. Cl.[7] .................................................. G06K 9/20
(52) U.S. Cl. ........................................................ 382/312
(58) Field of Search ................. 382/312; 348/294–301, 348/246, 247; 250/559.05, 559.06, 559.07

(56) References Cited

U.S. PATENT DOCUMENTS 4,751,659 A * 6/1988 Hecht .......................... 358/1.8

* cited by examiner

Primary Examiner—Leo Boudreau
Assistant Examiner—Tom Y. Lu
(74) Attorney, Agent, or Firm—J. C. Patents

(57) ABSTRACT

An apparatus for dark level integration comprises a programmable gain amplifier for amplifying signal levels from the pixel. A calibration signal generator for receiving a first calibration signal and a bad pixel signal to generation a second calibration signal, wherein the second calibration signal indicates the existence of the bad pixel. A dark current calibration integrator couples to the programmable gain amplifier and the calibration signal generator for receiving the amplified signal levels from the programmable gain amplifier and the second calibration signal to generate a control signal to the programmable gain amplifier.

4 Claims, 2 Drawing Sheets

METHOD AND APPARATUS FOR DARK LEVEL INTEGRATION OF IMAGE SENSOR WITHOUT INTEGRATING BAD PIXELS

CROSS-REFERENCE TO RELATED APPLICATION

This application claims the priority benefit of U.S. Provisional Application Ser. No. 60/217,535, filed Jul. 12, 2000, the full disclosure of which is incorporated herein by reference.

BACKGROUND OF THE INVENTION

1. Field of Invention

The present invention relates to a method and apparatus for dark level integration of an image sensor. More particularly, the present invention relates to a method and apparatus for dark level integration of an image sensor without integrating bad pixels.

2. Description of Related Art

For an image sensor, the signals read from the pixels of the image sensor have to be amplified. In general, as shown in FIG. 1, a programmable gain amplifier (PGA) 10 is used for amplifying the signal levels from the pixel. In order to further maximize the dynamic range of the possible ADC circuit, a dark level calibration integrator 20 is used for measuring and storing the dark current level. The dark current level takes place when the read out circuit of the image sensor is reading the pixel output from the dark rows.

In general, as shown in FIG. 2, the image sensor 30 contains dark rows 32, 34, 36 and 38. For example, the image sensor has a size of 352 row by 288 column. As shown in FIG. 3, which shows a timing diagram of the calibration signal CAL according to conventional method, when a dark row D appears, the calibration signal CAL asserts to enable the dark current calibration integrator 20. However, due to the current process, it is hard to fabricate an image sensor perfectly without any bad or defective pixel thereon. Therefore, there are always some defective pixels on the image sensor after it is fabricated. The dark row is also possible containing bad pixels therein.

According to the conventional method, if there are bad pixel in the dark rows of the image sensor, the dark level calibration integrator will average all of the pixel values including the bad pixels when the calibration signal is asserted. The calibration then causes significant errors

SUMMARY OF THE INVENTION

The invention provides an apparatus for dark level integration. The apparatus comprises a programmable gain amplifier, a calibration signal generator, and a dark current calibration integrator. The programmable gain amplifier (PGA) is used for receiving signals from pixels of an image sensor and for amplifying levels of the signals from the pixel. The calibration signal generator is used for receiving a first calibration signal and a bad pixel signal to generate a second calibration signal, wherein the second calibration signal indicates the existence of the bad pixel. The dark current calibration integrator couples to the programmable gain amplifier and the calibration signal generator for receiving the amplified signal levels from the programmable gain amplifier and the second calibration signal to generate a control signal to the programmable gain amplifier. The second calibration signal disables the dark current calibration integrator when the first calibration signal and the bad pixel signal have the same logic state.

The calibration signal generator mentioned above can consists of logic gates, for example an AND gate and an inverter. The inverter receives the bad pixel signal and outputs an inverted bad pixel signal to the AND gate, and the AND receives the first calibration signal and the inverted bad pixel signal to generate the second calibration signal.

The invention further provides a method for dark level integration. The method comprises the following steps: receiving signals from pixels of an image sensor; detecting a first calibration signal and a bad pixel signal; calibrating a dark current of the image sensor to generate a control signal when the first calibration signal and the bad pixel signal are not the same logic level; and amplifying the signals from the pixel in response to the control signal.

Accordingly, the present invention provides an easy and simple method and apparatus to avoid integrating the bad pixels into the dark current level of the image sensor. The invention can further reduce cost.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
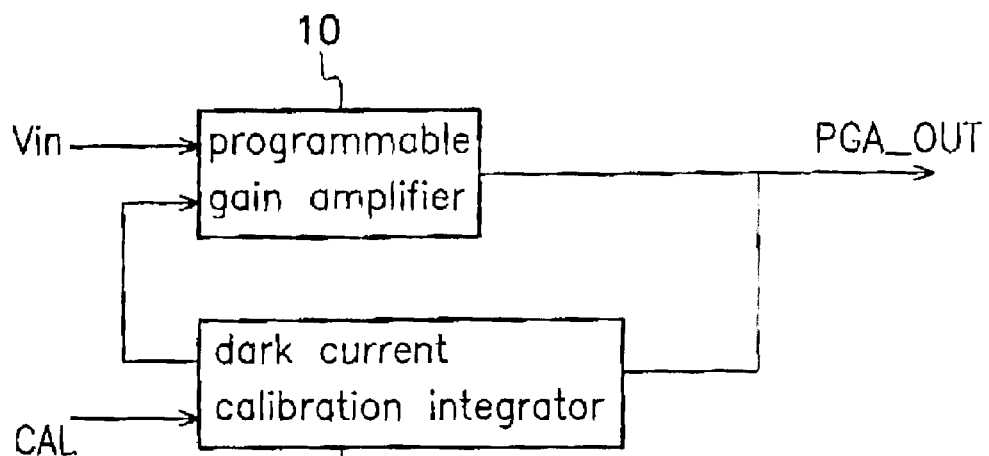
FIG. 1 shows a block diagram of the apparatus for dark level integration according to conventional method.
Figure 2:
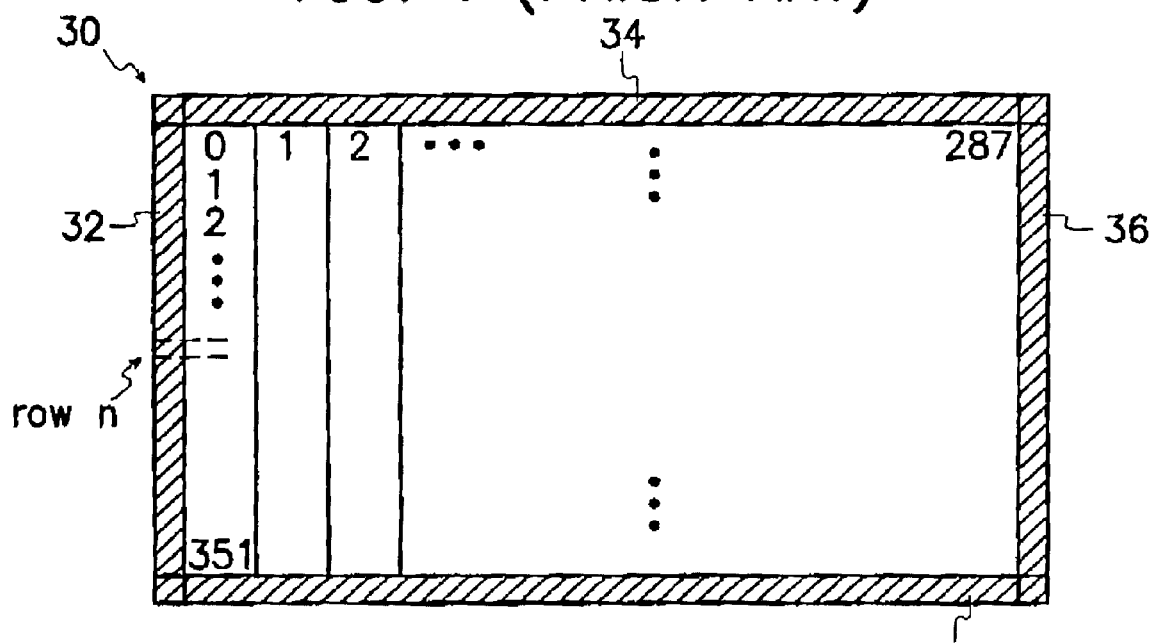
FIG. 2 shows a typical image sensor having dark rows.
Figure 3:
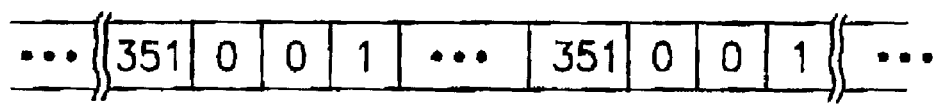
FIG. 3 shows a timing diagram of the calibration signal CAL according to conventional method.
Figure 4:
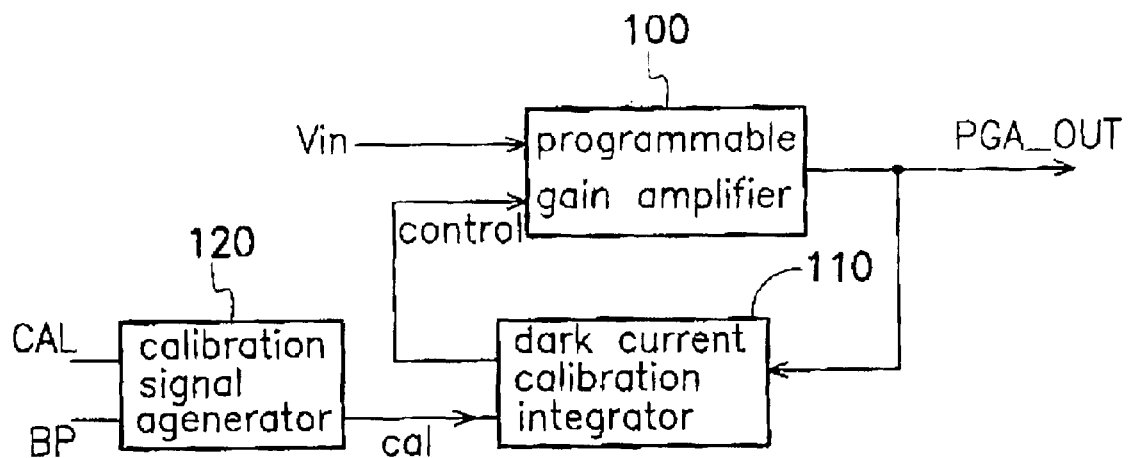
FIG. 4 shows a schematic block diagram of the apparatus for dark level integration according to one embodiment of the present invention.

Referring to FIG. 4 which shows a schematic block diagram of the apparatus for dark level integration according to one embodiment of the present invention.

The apparatus for dark level integration comprises a programmable gain amplifier (PGA) 100, a calibration signal generator 120, and a dark current calibration integrator 110. The programmable gain amplifier (PGA) 100 is used for receiving signals Vin from pixels of an image sensor and for amplifying levels of the signals from the pixel. The calibration signal generator 120 is used for receiving a first calibration signal CAL and a bad pixel signal BP to generation a second calibration signal cal, wherein the second calibration signal cal indicates the existence of the bad pixel. The dark current calibration integrator 110 couples to the programmable gain amplifier 100 and the calibration signal generator 120 for receiving the amplified signal levels PGA_OUT from the programmable gain amplifier 100 and the second calibration signal cal to generate a control signal CONTROL to the programmable gain amplifier 100. The second calibration signal cal disables the dark current calibration integrator 110 when the first calibration signal CAL and the bad pixel signal BP have the same logic state. This is described in detail as following.

Figure 5:
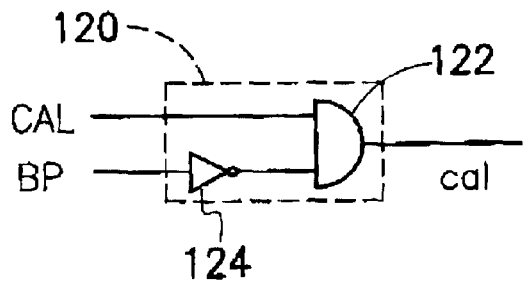
FIG. 5 shows an example circuit of the calibration signal generator.

The calibration signal generator 120 mentioned above can consists of logic gates, for example an AND gate 122 and an inverter 124, as shown in FIG. 5. The inverter 124 receives the bad pixel signal BP and outputs an inverted bad pixel signal to the AND gate 122, and the AND gate 122 receives the first calibration signal CAL and the inverted bad pixel signal to generate the second calibration signal cal.

In addition, the bad pixel signal is generated from a bad pixel detection circuit. The bad pixel addresses in the dark row are also stored first during test of the image sensor.

Figure 6:
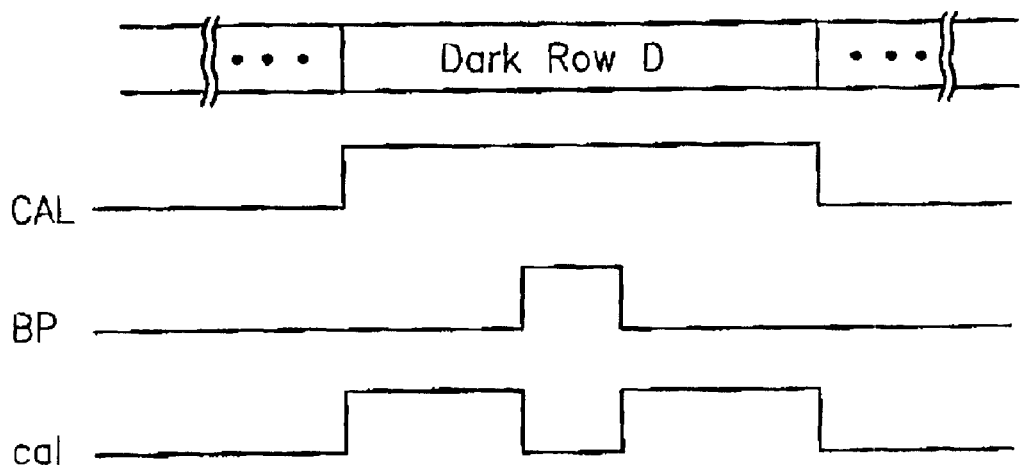
FIG. 6 shows a timing diagram of the first calibration signal CAL, bad pixel signal BP, and second calibration signal cal with the position of the bad pixel in the dark row.

FIG. 6 shows a timing diagram of the first calibration signal CAL, bad pixel signal BP, and second calibration signal cal with the position of the bad pixel in the dark row.

As shown in FIG. 6, when the dark row D appears, the first calibration signal is transferred to a first logic state, such as a logic 1 state corresponding to the dark row. If the dark row D has one bad pixel, the bad pixel signal is transferred to the firs logic state to indicate that there is a bad pixel. The bad pixel signal BP and the first calibration CAL are inputted to the calibration signal generator 120 to assert the second calibration signal cal. The second calibration signal cal is also in the logic 1 state during the appearance of the dark row if no bad pixel exists.

As shown in FIG. 6, when the bad pixel signal BP is the logic 1 state, which means a bad pixel in the dark row, the second calibration cal is transferred to the logic 0 state in response to the bad pixel signal BP. This will disable the operation of the dark current calibration integrator 110. Therefore, the dark current calibration integrator does not integrate bad pixels The invention also provides a method for dark level integration. The method comprises the steps of receiving signals Vin from pixels of an image sensor; detecting a first calibration signal CAL and a bad pixel signal BP; calibrating a dark current of the image sensor to generate a control signal when the first calibration signal CAL and the bad pixel signal BP are not the same logic level; and amplifying the signals PGA_OUT from the pixel in response to the control signal.

Accordingly, the present invention provides an easy and simple method and apparatus to avoid integrating the bad pixels into the dark current level of the image sensor. The invention can further reduce cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for dark level integration, comprising:
    a programmable gain amplifier, for receiving signals from pixels of an image sensor and amplifying levels of the signals from the pixel;
    a calibration signal generator for receiving a first calibration signal and a bad pixel signal to generate a second calibration signal, wherein the second calibration signal indicates the existence of the bad pixel; and
    a dark current calibration integrator, coupling to the programmable gain amplifier and the calibration signal generator, for receiving the amplified signal levels from the programmable gain amplifier and the second calibration signal to generate a control signal to the programmable gain amplifier,
    wherein the second calibration signal disables the dark current calibration integrator when the first calibration signal and the bad pixel signal have the same logic state.

2. The apparatus of claim 1, wherein the calibration signal generator further comprising an AND gate and an inverter, wherein the inverter receives the bad pixel signal and outputs an inverted bad pixel signal to the AND gate, and the AND receives the first calibration signal and the inverted bad pixel signal to generate the second calibration signal.

3. The apparatus of claim 2, wherein the bad pixel signal is generated from a bad pixel detection circuit.

4. A method for dark level integration, comprising:
    receiving signals from pixels of an image sensor and amplifying levels of signals from the pixel;
    receiving a first calibration signal and a bad pixel signal to generate a second calibration signal, wherein the second calibration signal indicates the existence of the bad pixel;
    receiving the amplified signal levels and the second calibration signal to generate a control signal when the first calibration signal and the bad pixel signal are not the same logic level; and
    amplifying the signals from the pixel in response to the control signal.

* * * * *